United States Patent
Beyer et al.

(10) Patent No.: US 6,423,921 B2
(45) Date of Patent: Jul. 23, 2002

(54) METHOD AND APPARATUS FOR PROCESSING COMPONENTS IN WHICH A MOLTEN PHASE IS PRODUCED BY LOCAL ENERGY INPUT

(75) Inventors: Eckhard Beyer, Weipig; Ralf Imhoff, Aachen, both of (DE)

(73) Assignee: Fraunhofer-Gesellschaft zur Forderung der angewandten Forschung e.V., Munich (DE)

(*) Notice: Subject to any disclaimer, the term of this patent is extended or adjusted under 35 U.S.C. 154(b) by 0 days.

(21) Appl. No.: 09/802,455

(22) Filed: Mar. 9, 2001

(30) Foreign Application Priority Data

Mar. 13, 2000 (DE) .......................... 100 12 792

(51) Int. Cl.⁷ .............................. B23K 10/00
(52) U.S. Cl. ..................... 219/121.44; 219/121.39; 219/121.72; 219/121.46
(58) Field of Search ............... 219/121.45, 121.46, 219/121.39, 121.44, 121.63, 121.64, 137 R, 137 WM, 121.72

(56) References Cited

U.S. PATENT DOCUMENTS

| | | | |
|---|---|---|---|
| 5,079,070 A | * | 1/1992 | Chalco et al. ............ 156/233 |
| 5,149,939 A | | 9/1992 | Imaizumi et al. |
| 5,614,113 A | * | 3/1997 | Hwang et al. ......... 219/121.64 |
| 5,699,950 A | | 12/1997 | Jang |
| 6,171,415 B1 | * | 1/2001 | Statnikov ................. 228/110.1 |

FOREIGN PATENT DOCUMENTS

| | | | |
|---|---|---|---|
| EP | 0403736 A3 | | 12/1990 |
| JP | 5185252 | * | 7/1993 |
| JP | 10080765 | | 3/1998 |
| SU | 1118510 | | 10/1984 |

* cited by examiner

Primary Examiner—Mark Paschall
(74) Attorney, Agent, or Firm—Brinks Hofer Gilson & Lione

(57) ABSTRACT

Apparatus and methods for processing work piece components in which a molten phase is produced by a local energy input from at least one of an electric arc, a jet of combustible gas, an electron plasma, and a laser beam. At least one transducer is included for imparting oscillations having a frequency above 15 kHz. The oscillations can be imparted to one or more of the components, the region of the molten phase, and/or to any filler material that is added to the region of the molten phase. The apparatus and methods can be used with known thermal soldering, welding and cutting methods to improve the quality of weld beads and cut edges that are formed, and to increase the processing rate.

33 Claims, 4 Drawing Sheets

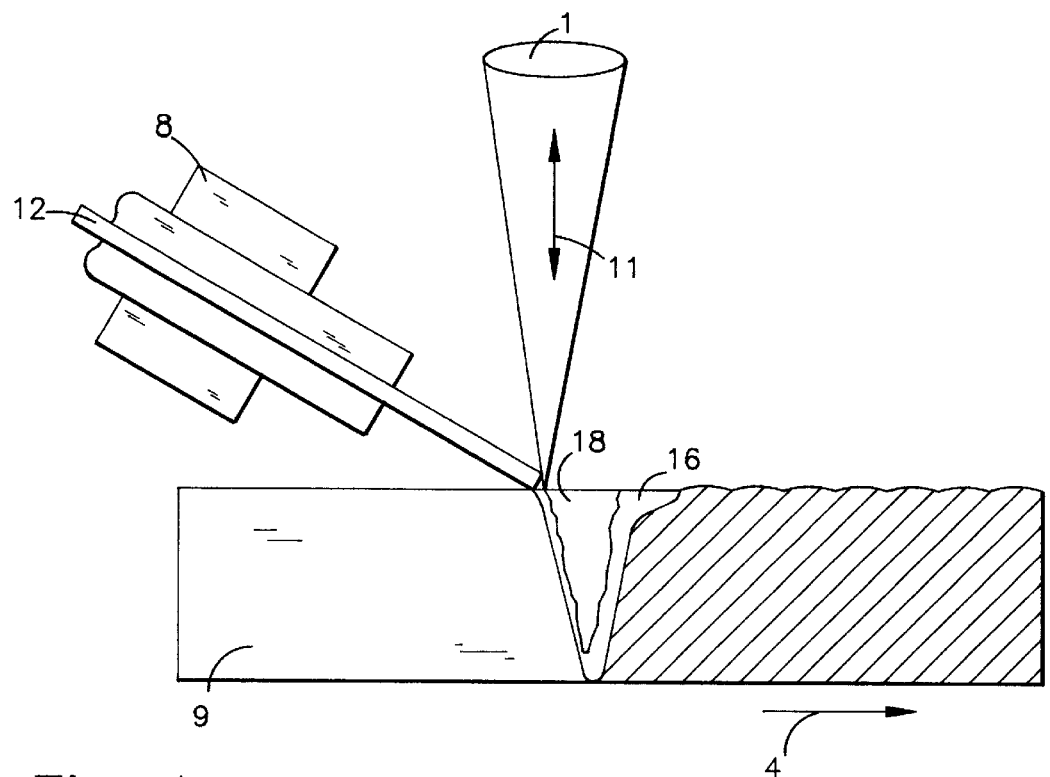
Fig. 4
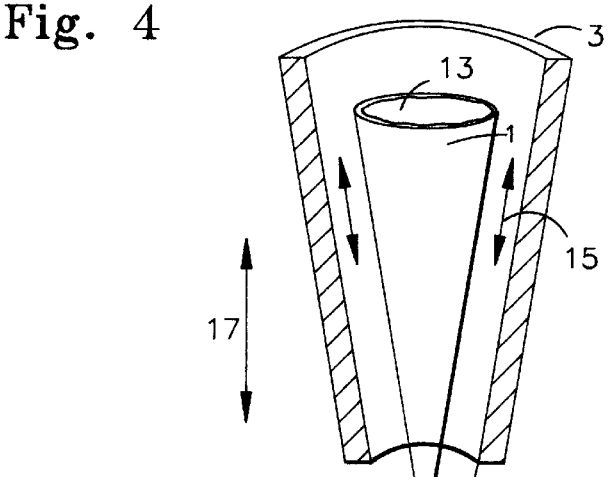
Fig. 6
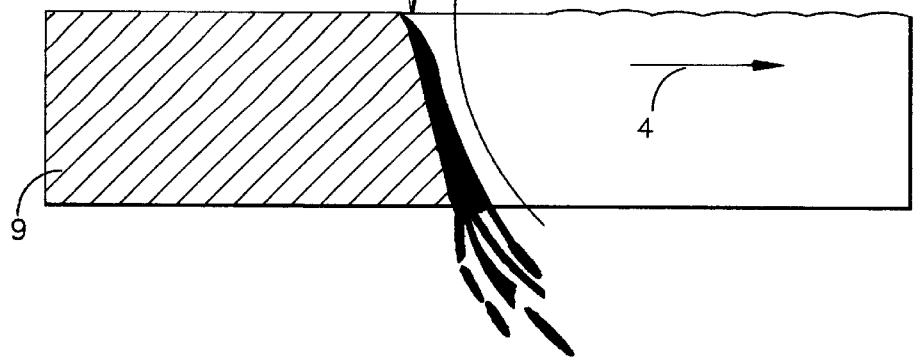

METHOD AND APPARATUS FOR PROCESSING COMPONENTS IN WHICH A MOLTEN PHASE IS PRODUCED BY LOCAL ENERGY INPUT

BACKGROUND OF THE INVENTION

The invention relates to a method and to correspondingly designed apparatus for processing components in which a molten phase is produced by local energy input. In this regard, the invention can be used in conjunction with known thermal soldering, welding and cutting methods.

During known welding and cutting methods, a molten phase is produced locally in a controlled way by energy input. Intense substance movements, which are caused, inter alia, by the so-called Marangoni effect, take place inside the melt that is formed. The intensity depends on the respective materials, the energy density and the resulting temperature gradients. This effect is due to the surface tension of the materials which is influenced as a function of temperature. This effect is, in particular, caused and influenced by large temperature gradients as a result of very high energy intensities, as are encountered especially in the case of laser beams, electron beams or plasma beams.

Owing to high shear stresses at the surface of the molten phase, speeds of the substance movement of the order of about 1 m/s occur. Since it has, to date, been very difficult to influence these processes, it was necessary to accept surface irregularities such as burnt-in notches, which occur at the section edges when the melt re-solidifies during welding or re-melting, and also pore formation during welding.

In the case of thermal cutting methods, such as e.g. laser-beam cutting, an intense gas jet expels the locally produced melt from the section join that is formed. When this happens, grooves are formed at the cut edges and, in many applications, necessitate mechanical finishing of the cut edges.

In the case of thermal cutting, it is further necessary to provide for the fact that the capillary forces and the surface tensions are correspondingly increased in a narrow section join, and correspondingly higher resistances oppose the ejection of the melt from the section-join region. Consequently, the cutting process is substantially influenced by the nozzle configuration and the gas stream used, i.e. the gas speed or the respective flow rate. This predominately affects the processing rate that can be achieved, and imposes corresponding limits for the high-speed cutting, especially when cutting thick sheet metal.

The object of the invention is to provide a method and correspondingly designed apparatus which can improve the quality of the weld beads and cut edges that are formed, and which can increase the processing rate.

SUMMARY OF THE INVENTION

According to the present invention, this object is achieved by imparting oscillations having a frequency above 15 kHz to at least one of the components or work pieces that is being welded, soldered or cut, or to the region of the molten phase existing during the welding, soldering or cutting, or to a filler material that is being added to the region of the molten phase. The molten phase can be produced by a local energy input using at least one of the group consisting of an electric arc, a jet of combustible gas, an electron plasma, and a laser beam.

According to the invention, the oscillations are imparted to the work piece or to one or more components to be bonded together or a filler material, such as e.g. a filler wire, a solder or a powder. The oscillations have a frequency above 15 kHz and are preferably oscillations in the ultrasonic range. The effect thereby achieved is that these oscillations also act in the molten phase and can reduce its surface tension. The invention can be used in a wide variety of thermal soldering, cutting, welding, coating and re-melting methods, and it can have advantageous effects especially in methods where high energy densities can be achieved. The methods can also be implemented simultaneously in combination with one another, wherein at least two different energy sources being used.

The oscillations can be stimulated in a work piece component, or in the molten phase, and can be produced in various ways that will be discussed more fully below.

Using the invention, for example in the case of thermal cutting methods, such as e.g. laser-beam cutting, the melt ejection is significantly facilitated and it is consequently possible to work with a lower gas pressure while still achieving the same or even a higher processing rate. Furthermore, the groove formation which has already been mentioned in the description of the prior art is significantly reduced, so that mechanical finishing of the cut edges becomes unnecessary in many cases. Furthermore, using the invention, the so-called whisker adhesion on the components is eliminated or at least largely avoided.

In thermal welding methods, a more uniform and pore-free weld bead is formed, and the interfaces between the weld bead and the component substrate can likewise be formed more homogeneously and consequently with better mechanical properties as well, especially in terms of strength. The surface of the weld bead or weld track is also formed more smoothly.

The oscillations stimulated in the component can be produced using at least one oscillator or transducer, which, for example, employs the piezoelectric effect. Such a transducer can be installed immediately on the surface of the component, and the oscillations excited in it can thus be injected into the component. It may be preferable for a liquid film to be formed between the component surface and the transducer to improve the coupling.

Such a transducer can also be arranged on a clamping device for clamping components of the work piece that are to be correspondingly processed, or can be integrated in such a clamping device, so that various component formats can also be readily influenced according to the invention. It is, of course, also possible to use more than one such transducer, in which case it will generally be expedient to operate them in such a way that the oscillations applied from the various transducers do not lead to any substantial amplitude reduction. In that case, the different distances of the respective transducers from the molten phase, which is currently being formed, and the respective speed of sound in the component, should be taken into account.

If the injection of the oscillations does not take place via the component substance and their propagation through the component, it may be expedient for the injection of the oscillations to take place in the immediate vicinity of the molten phase. In this way, attenuation effects can be substantially minimized.

For instance, it may be expedient to inject oscillations not directly using an transducer, but via a coupling element, which can for example be a moving roller or a wheel to which oscillations are correspondingly applied. Such a roller or wheel can be moved along the component surface, even underneath it, so that it is possible to maintain a relatively small and constant distance from the molten phase that is formed, even when there is corresponding relative movement between the component and the current location of the energy input. For example, such a roller can be rigidly connected to a processing head, e.g. a laser-processing head, which is moved over the component.

It may furthermore be favorable if a component to be correspondingly processed is at least partially immersed in a liquid. The component can then be half-surrounded or fully surrounded by a liquid, as is the case, e.g., when cutting under water.

Another possible way of injecting oscillations is for oscillations to be imparted to a filler material that is added, which can be a filler wire or an electrode as are already employed in welding methods. The injection of sound can also be used to influence the dripping of the filler wire, e.g., during electric arc welding wherein it is possible in particular to form smaller drops. However, injection of the oscillations can also be carried out by using powder or flux that is added or by using a solder.

Another possible way of generating forced oscillation in the component and/or in the molten phase is to direct an oscillating jet of liquid at the component surface, in which case a corresponding frequency should be selected. By way of example, a corresponding oscillation can be superimposed on the stream of shielding or cutting gas which is directed at the component surface, particularly in the region of the molten phase, so that the desired effect can likewise be achieved in this way.

The generation of oscillations in the favorable frequency range can also be achieved by correspondingly controlling the power of a laser beam. In this case, the power is periodically increased in pulses and then oscillations develop in the resonator of the laser-light source, so that short intense laser-beam pulses are directed at the component that is to be processed that cause short-term evaporation of the material surface, and consequently an elevated pressure on the molten phase. In the event that no evaporation takes place, the correspondingly created heat sources can also cause a comparable effect. If a laser-light source in the form of a $CO_2$ laser is employed, an oscillating resonator mirror, which oscillates in the desired frequency range, can utilized with this laser-light source.

Another possible way of generating the desired oscillations, at least in the region of the molten phase, can also be achieved by transmitting oscillations through the surrounding air. For example, an transducer in the form of an ultrasonic transmitter can be excited at a selected distance from the component surface. Such an ultrasonic transmitter should preferably be able to direct a relatively narrow sound cone at the molten phase.

The energy required for exciting the oscillation can, for example, be reduced by selecting a frequency at which resonance takes place in the molten phase. Since, in this case, substance-specific conditions not only have an influence but also may change during the processing, it is preferable to work with oscillations within a predetermined frequency interval, which is successively swept through, so that the excitation is carried out at various frequencies within this interval.

Another similar possible way is to use oscillations having component-specific wavelengths, at which constructive interference takes place in the respective component so that amplitude maxima occur. Additional variations will become apparent to those skilled in the art from the following description of the invention in relation to the illustrated examples that follow.

BRIEF DESCRIPTION OF THE DRAWINGS

FIG. 4 shows an example of a device according to the invention in two representations, in which a filler material is added during laser welding.

FIG. 6 shows an example of a device according to the invention, in which an oscillating liquid is directed at the surface of a component via a cutting or welding nozzle.

DESCRIPTION OF ILLUSTRATIVE EXAMPLES OF THE INVENTION

Figure 1A:
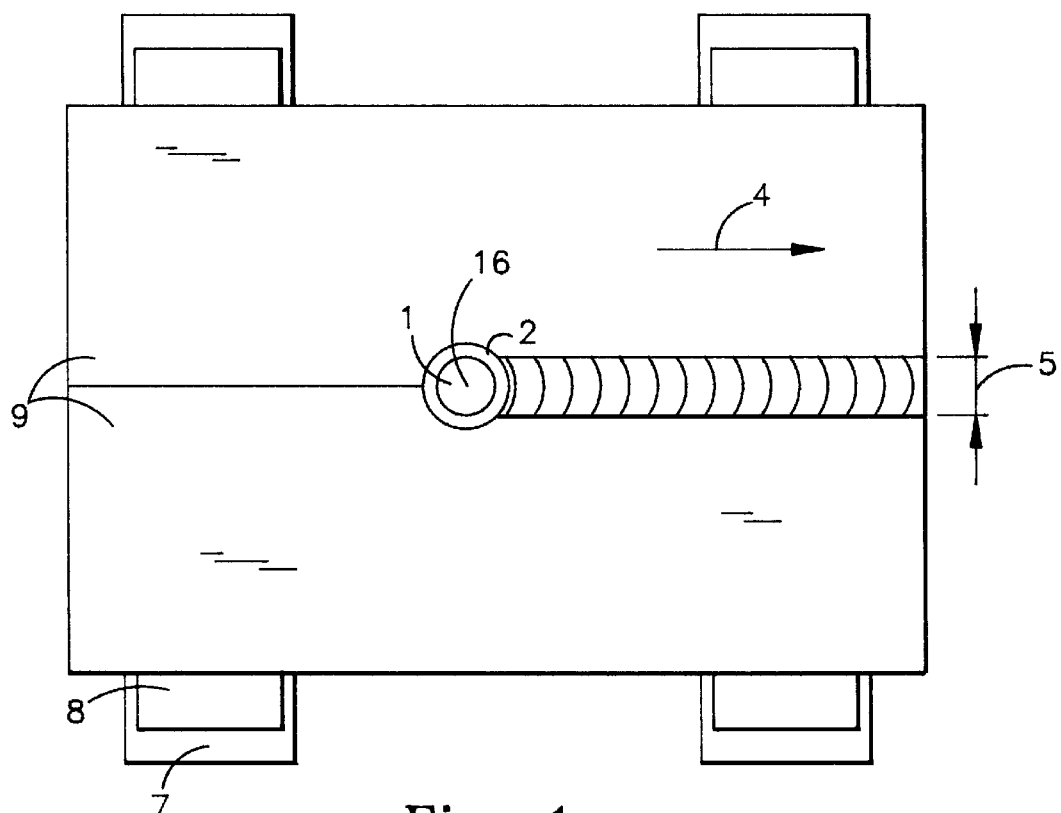
FIG. 1a shows a schematic representation in which two components are bonded together by means of welded connection.

FIG. 1a shows a first example of the invention in which two work piece components 9 are held together by means of a clamping device 7. A welding and, accordingly, permanent bonding-together of the two components 9, is achieved, for example, using a beam 1 which has a relatively high energy density at the join 6 between the two components 9. The plan view, which is shown in FIG. 1a, illustrates the way in which, by relative movement of the energy beam 1 and components 9, a molten phase 16 is obtained that is locally controlled by a gas jet 2, and whose local position relative to the beam 1 is maintained by relative movement between the components 9 and the energy beam 1, as shown by the arrow 4, so that a weld bead 5 is formed along the join between the components 9 when the molten phase of 16 cools.

In the example shown in FIG. 1a, one of the clamping devices 7, of which there are four shown, carries an transducer 8 with which oscillations are induced in at least one of the two components 9 and propagate inside this component 9 as far as the molten phase 16. The surface tension of the molten phase 16 is correspondingly reduced with respect to the solid substance of the components 9 and the advantages mentioned in the general part of the description can consequently be achieved.

Figure 1B:
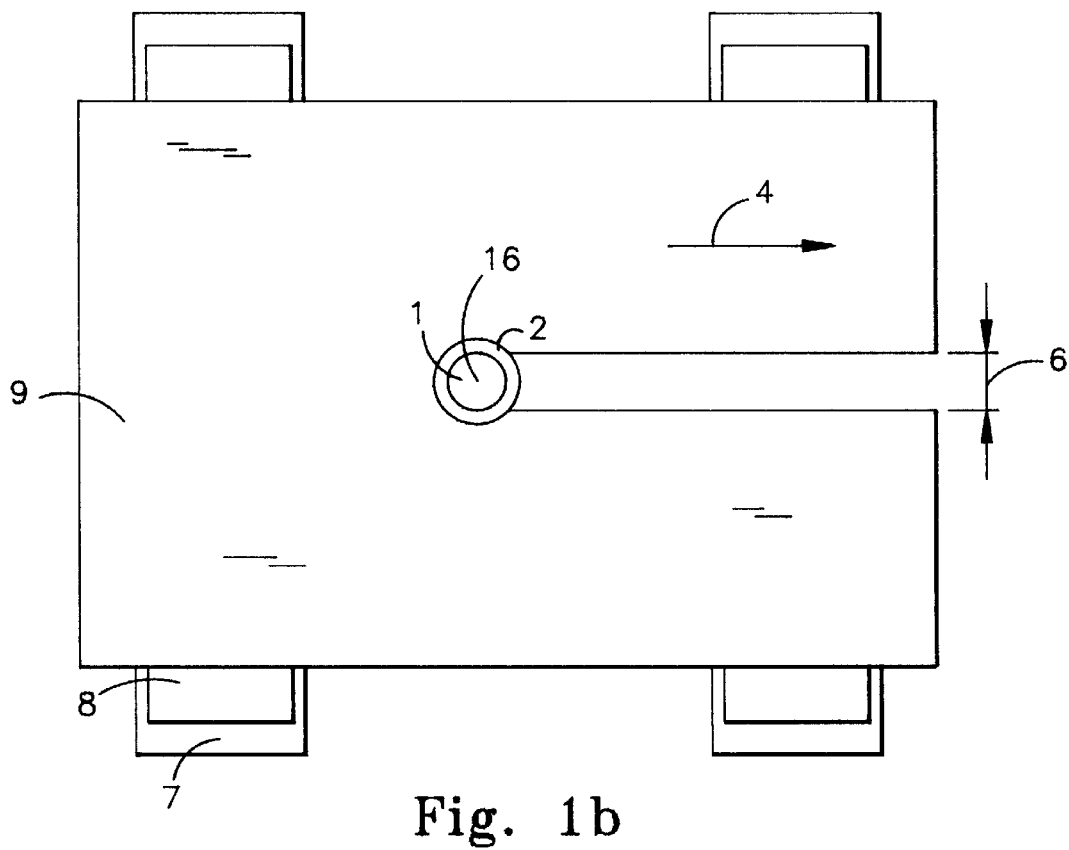
FIG. 1b shows a schematic representation in which one component is to be cut into two parts.

The essential aspects of the example shown in FIG. 1b correspond to those of the example according to FIG. 1a. Only a single component 9 is held fixed in the clamping devices 7, and in this case it is cut into two parts by means of the energy beam 1. Instead of the weld bead 5, a section line 6 is formed which exhibits substantially less groove formation and at least reduced whisker adhesion compared with conventional processing.

Figure 2:
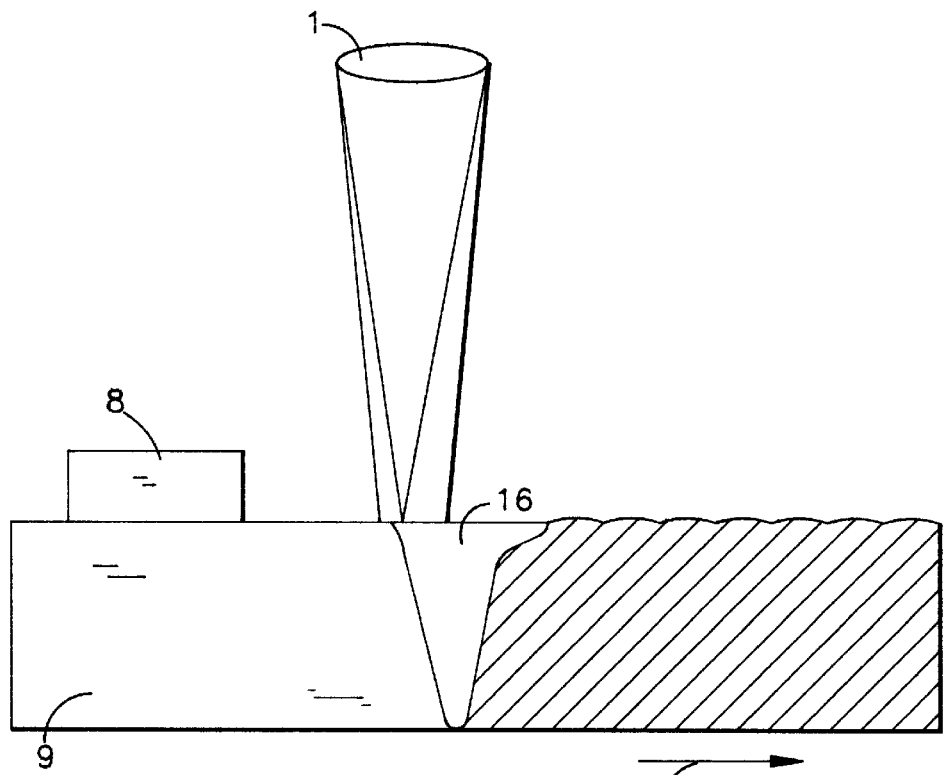
FIG. 2 shows a side view in section, in which one component is to be cut by means of a laser beam.

In the example shown in FIG. 2, an transducer 8 is installed immediately on the surface of the component 9, and the injection of the oscillations hence takes place in a very direct way. The molten phase 16 on the component 9 is in this case produced using a laser beam 1 and, as indicated here by the shading in the right-hand part of the component 9, a section line 6 is formed in the component 9. The position of the beam spot relative to the component 9 is variable, as indicated by the arrow 4.

Figure 3:
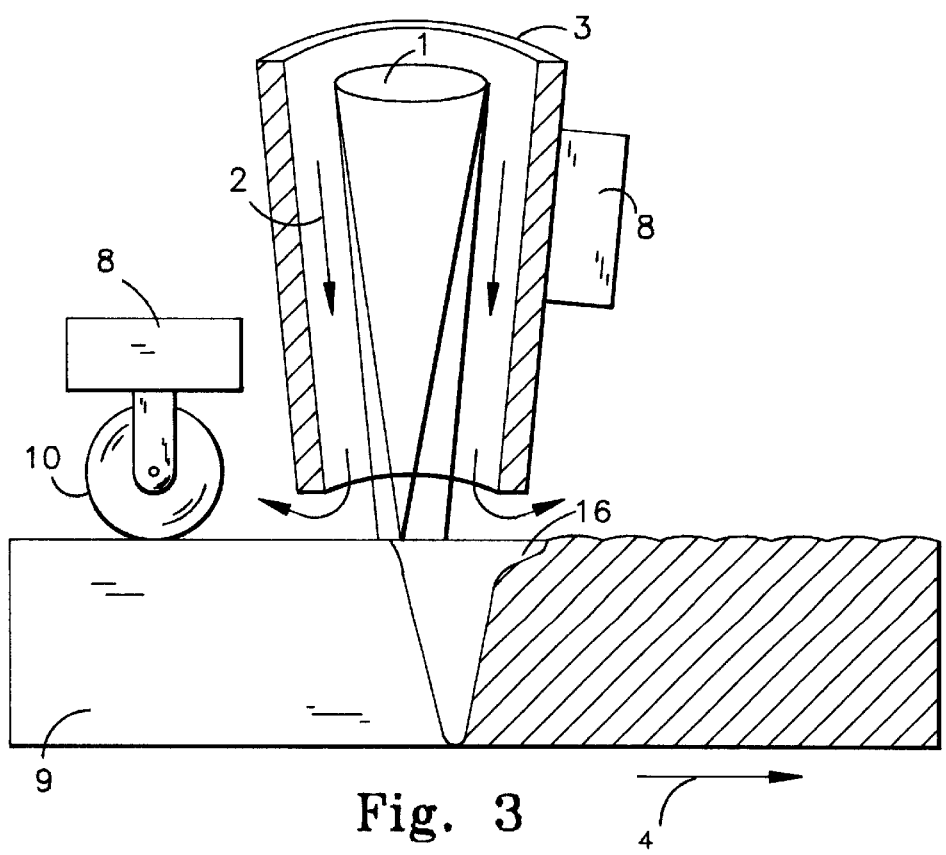
FIG. 3 shows an example of a device in a sectional side view.

The example shown in FIG. 3 illustrates two possible ways to carry out the method of according to the invention whereby oscillations can be applied to or injected into the component 9. On the one hand, an transducer 8 is connected to a roller 10 which can be moved over the surface of the component 9, so that the distance between the molten phase 16 and the oscillation injection can be kept constant even in the event of a corresponding relative movement in direction 4.

The second possible way, in this example, in which oscillations can be injected is for an transducer 8 to be connected to a cutting or welding gland 3 through which either a cutting or shielding gas 2 can be directed at the component surface, especially in the region of the molten phase 16 or, in the case of cutting, in the section-join region 6. The oscillations of the transducer 8 are then transmitted to the gas stream and the desired effect can be correspondingly achieved.

It is feasible to use just one of the two possibilities for oscillatory influence, or to use both in combination or to use any combination of such possibilities as have already been described, or those which have yet to be described.

In the example shown in FIG. 4 as well, two other different possible ways of achieving the effect according to the invention are represented. In this case, a filler material (here a filler wire 12) is delivered by a filler feeder into the region of the molten phase 16 which is formed around a capillary 18. A transducer 8, whose oscillations are injected into the filler wire 12, is in turn provided on the filler feeder, so that on the one hand the oscillations influence the molten phase 16. Advantageously, on the other hand, the dripping behavior of the melting filler wire, e.g., in the case of MAG or MIG welding, is favorably influenced. The second representation in FIG. 4 reveals the way in which the dripping behavior of the filler wire 12 can be improved with smaller drops during arc welding.

The double arrow 11 in FIG. 4 indicates the way in which the power of an energy beam, e.g., a laser beam, can be influenced in a pulse form. Besides the aforementioned generation of natural oscillations in the resonator, this can also be accomplished, for example, through alternating power densities which are achieved by changes in the focusing, i.e. correspondingly influencing an optical focusing system or a beam-shaping unit.

Figure 5:
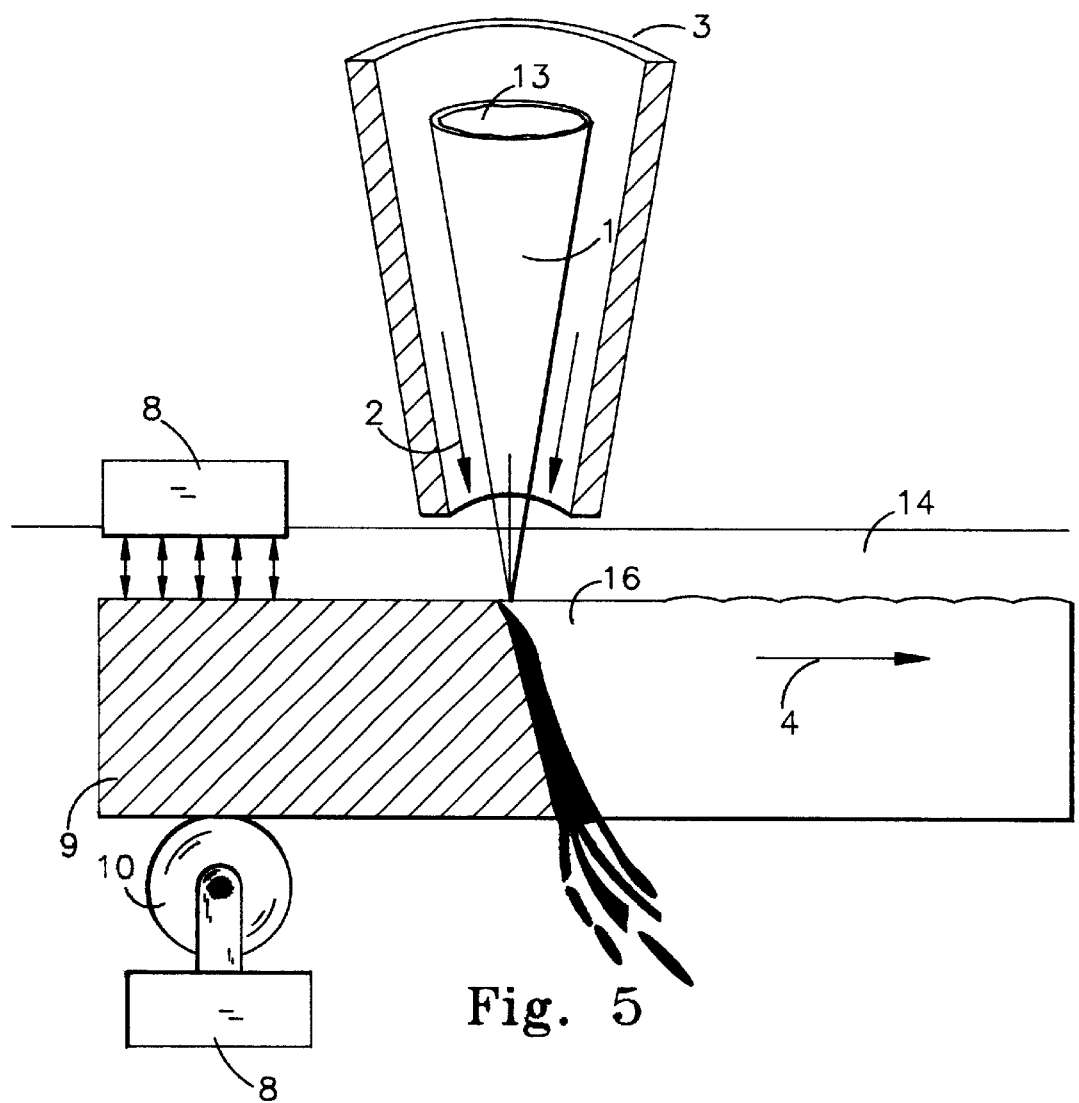
FIG. 5 shows another example of a device according to the invention.

In the example shown in FIG. 5, a laser beam 1, e.g., of a solid-state laser, is directed, through a cutting or welding nozzle 3 in which an optical lens 13 for beam shaping is arranged to focus the beam 1 onto the surface of a component 9 on which a liquid film 14 has been formed. As in the case of the example according to FIG. 2, a transducer 8 is installed on the surface of the component 9, although the injection of the oscillations into the component 9 can be favorably influenced via the liquid film 14. Injection of oscillations using a transducer 8 and a roller 10, as in the example according to FIG. 3, can additionally take place.

FIG. 6 represents the way in which an oscillating liquid 15 can be directed through a cutting or welding nozzle 3, through which a laser beam 13 from a solid-state laser is in turn directed onto the component 9. In the representation shown in FIG. 6, the oscillating liquid is indicated by the double arrows 15 which are marked the inner wall of cutting or welding nozzle 3. As can likewise be seen from FIG. 6, the melt can be ejected from the section-join region, and the opportunity exists to use a cutting gas stream, either conventionally or likewise with oscillations applied to it, in addition to the liquid 15. The oscillations of the gas or liquid 15 can also be achieved by moving the cutting or welding nozzle 3 to and fro in translation, as indicated by the double arrow 17, orthogonally at a corresponding frequency relative to the component surface.

What is claimed is:

1. A method for cutting a component comprising the steps of:
    producing a molten phase by a local energy input using at least one of the group consisting of a jet of combustible gas, an electron plasma, and a laser beam; and
    imparting oscillations having a frequency above 15 kHz in the region of the molten phase so that the component is cut.

2. The method of claim 1 further comprising the step of: clamping at least one transducer to the component; the transducer imparting said oscillations at least into the component to which it is clamped.

3. The method of claim 1 further comprising the step of: providing a roller for contacting a surface of the component and providing a transducer coupled to the roller, the transducer imparting said oscillations at least into the component contacted by the roller.

4. The method of claim 1 further comprising the step of: providing a liquid film on a surface of the component, and providing a transducer coupled to the liquid film, the transducer imparting said oscillations at least into the component through the liquid film.

5. The method of claim 4 further comprising the step of immersing the component in the liquid film forming liquid.

6. The method of claim 1 further comprising the step of directing an oscillating jet of liquid at a surface of the component, the jet of liquid imparting said oscillations at least into the component to which the jet is directed.

7. The method of claim 1 further comprising the step of directing a gas with a superimposed oscillation at the region of the molten phase, the gas imparting said oscillation at least into the molten phase.

8. The method of claim 1 further comprising the steps of directing a laser beam toward the component and supplying a periodically varying amount of power to the laser to impart said oscillations at least into the molten phase.

9. The method of claim 8 wherein the periodically varying amount of power is in the form of pulses at a frequency above 15 kHz.

10. The method of claim 1 further comprising the step of directing sound waves through air at the component surface in the region of the molten phase.

11. The method of claim 1 further comprising the step of tuning the oscillations to a resonance range of the molten phase.

12. The-method of claim 1 further comprising the step of tuning the oscillations to a component-specific wavelength at which constructive interference takes place in the component.

13. The method of claim 1 further comprising the steps of directing a laser beam toward the component and periodically changing the focus of the laser beam at a frequency above 15 kHz.

14. The method of claim 1 further comprising the steps of providing a plurality of transducers, computing the separation distance of each of the transducers from the molten phase and the speed of sound in the component, and operating the transducers at a synchronous frequency to minimize destructive interference.

15. The method of any of claims 1–14 further comprising the step of applying the oscillations in the immediate vicinity of the molten phase.

16. Apparatus for cutting a component in which a molten phase is produced by a local energy input comprising at least one of the group consisting of a jet of combustible gas, an electron plasma, and a laser beam; and at least one transducer for imparting oscillations having a frequency above 15 kHz in the region of the molten phase to improve the cutting of the component.

17. The apparatus of claim 16 further comprising at least one clamping device clamped to the component, and wherein the at least one transducer is coupled to the at least one clamping device.

18. The apparatus of claim 16 further comprising at least one roller adapted for contact to the component, and wherein the at least one transducer is coupled to the at least one roller.

19. The apparatus of claim 16 further comprising a nozzle through which a stream of gas can be directed toward the component, and wherein the at least one transducer is coupled to the nozzle.

20. The apparatus of claim 16 further comprising a beam-shaping unit directing the laser beam toward the component, and wherein the at least one transducer is coupled to the beam shaping unit.

21. A method for processing components comprising the steps of:

producing a molten phase by a local energy input to at least one of the components using at least one of the group consisting of an electric arc, a jet of combustible gas, an electron plasma, and a laser beam;

providing a liquid film on a surface of at least one of the components; and providing a transducer coupled to the liquid film, the transducer imparting oscillations at least through the liquid film into at least the component having the liquid film on its surface, the oscillations having a frequency above 15 kHz.

22. A method for processing components comprising the steps of:

producing a molten phase by a local energy input to at least one of the components using at least one of the group consisting of an electric arc, a jet of combustible gas, an electron plasma, and a laser beam;

immersing at least one of the components in a film forming liquid; and providing a transducer coupled to the film forming liquid, the transducer imparting oscillations at least through the film forming liquid into at least the component immersed therein, the oscillations having a frequency above 15 kHz.

23. A method for processing components comprising the steps of:

producing a molten phase by a local energy input to at least one of the components using at least one of the group consisting of an electric arc, a jet of combustible gas, an electron plasma, and a laser beam; and directing an oscillating jet of liquid at a surface of at least one of the components, the jet of liquid imparting oscillations at least into the component to which the jet is directed, the oscillations having a frequency above 15 kHz.

24. A method for processing components comprising the steps of:

producing a molten phase by a local energy input to at least one of the components using at least one of the group consisting of an electric arc, a jet of combustible gas, an electron plasma, and a laser beam; and directing a gas with a superimposed oscillation at the region of the molten phase, the gas imparting said oscillations at least into the molten phase, the oscillations having a frequency above 15 kHz.

25. A method for processing components comprising the steps of:

producing a molten phase by a local energy input to at least one of the components using at least one of the group consisting of an electric arc, a jet of combustible gas, an electron plasma, and a laser beam;

directing a laser beam toward at least one of the components; and supplying a periodically varying amount of power to the laser to impart oscillations at least into the molten phase, the oscillations having a frequency above 15 kHz.

26. A method for processing components comprising the steps of:

producing a molten phase by a local energy input to at least one of the components using at least one of the group consisting of an electric arc, a jet of combustible gas, an electron plasma, and a laser beam;

directing sound waves through air toward at least one of the component surfaces in the region of the molten phase to impart oscillations at least into the molten phase, the oscillations having a frequency above 15 kHz.

27. A method for processing components comprising the steps of:

producing a molten phase by a local energy input using at least one of the group consisting of an electric arc, a jet of combustible gas, an electron plasma, and a laser beam;

imparting oscillations having a frequency above 15 kHz to at least one of:
at least one of the components,
in the region of the molten phase, and
a filler material that is added to the region of the molten phase; and tuning the oscillations to a resonance range of the molten phase.

28. A method for processing components comprising the steps of:

producing a molten phase by a local energy input using at least one of the group consisting of an electric arc, a jet of combustible gas, an electron plasma, and a laser beam;

imparting oscillations having a frequency above 15 kHz to at least one of.
at least one of the components,
in the region of the molten phase, and
a filler material that is added to the region of the molten phase; and tuning the oscillations to a component-specific wavelength at which constructive interference takes place in at least one of the components.

29. A method for processing components comprising the steps of:

producing a molten phase by a local energy input to at least one of the components using at least one of the group consisting of an electric arc, a jet of combustible gas, an electron plasma, and a laser beam;

directing a laser beam toward at least one of the components; and periodically changing the focus of the laser beam at a frequency above 15 kHz to impart oscillations at least into the molten phase.

30. A method for processing components comprising the steps of:
- producing a molten phase by a local energy input to at least one of the components using at least one of the group consisting of an electric arc, a jet of combustible gas, an electron plasma, and a laser beam;
- providing a plurality of transducers that are coupled to at least one of the components;
- computing the separation distance of each of the transducers from the molten phase and the speed of sound in the component; and
- operating the transducers at a synchronous frequency above 15 kHz to minimize destructive interference at least in the molten phase.

31. Apparatus for processing components comprising:
- a local energy input device for producing a molten phase in a region of the components, the local energy input device comprising at least one of the group consisting of an electric arc, a jet of combustible gas, an electron plasma, and a laser beam;
- a nozzle through which a stream of gas can be directed toward at least one of the components; and
- at least one transducer coupled to the nozzle for imparting oscillations having a frequency above 15 kHz via the stream of gas to at least one of:
  - at least one of the components,
  - in the region of the molten phase, and
  - a filler material that is added to the region of the molten phase.

32. Apparatus for processing components comprising:
- a local energy input device for producing a molten phase in a region of the components, the local energy input device comprising at least one of the group consisting of an electric arc, a jet of combustible gas, an electron plasma, and a laser beam,
- a filler material supplier including a roller supplying material to the region of the molten phase; and
- at least one transducer coupled to the roller of the filler material supplier for imparting oscillations having a frequency above 15 kHz via the filler material to at least one of:
  - at least one of the components,
  - in the region of the molten phase, and
  - a filler material that is added to the region of the molten phase.

33. Apparatus for processing components comprising:
- a local energy input device for producing a molten phase in a region of the components, the local energy input device comprising at least one of the group consisting of an electric arc, a jet of combustible gas, an electron plasma, and a laser beam;
- a beam-shaping unit for directing the laser beam toward the component; and
- at least one transducer coupled to the beam shaping unit for imparting oscillations having a frequency above 15 kHz via the laser beam to at least one of:
  - at least one of the components,
  - in the region of the molten phase, and
  - a filler material that is added to the region of the molten phase.

* * * * *